United States Patent
Eads et al.

(10) Patent No.: US 9,665,658 B2
(45) Date of Patent: May 30, 2017

(54) NON-BLOCKING QUEUE-BASED CLOCK REPLACEMENT ALGORITHM

(71) Applicant: Samsung Electronics Company, Ltd., Suwon, Gyeong gi-Do (KR)

(72) Inventors: Gage W. Eads, San Mateo, CA (US); Juan A. Colmenares, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 557 days.

(21) Appl. No.: 14/144,358

(22) Filed: Dec. 30, 2013

(65) Prior Publication Data

US 2015/0026412 A1  Jan. 22, 2015

Related U.S. Application Data

(60) Provisional application No. 61/856,620, filed on Jul. 19, 2013.

(51) Int. Cl.
*G06F 12/08* (2016.01)
*G06F 17/30* (2006.01)

(52) U.S. Cl.
CPC .............. *G06F 17/30902* (2013.01)

(58) Field of Classification Search
CPC .................................. G06F 17/30902
See application file for complete search history.

(56) References Cited

U.S. PATENT DOCUMENTS

| | | |
|---|---|---|
| 6,266,742 B1 | 7/2001 | Challenger et al. |
| 6,546,473 B2 | 4/2003 | Cherkasova et al. |
| 6,834,329 B2 | 12/2004 | Sasaki et al. |
| 6,996,676 B2 | 2/2006 | Megiddo et al. |
| 7,085,401 B2 | 8/2006 | Averbuch et al. |
| 7,111,290 B1 | 9/2006 | Yates, Jr. et al. |
| 8,108,620 B2 | 1/2012 | Anderson et al. |

(Continued)

OTHER PUBLICATIONS

Yui, M. et al., "Nb-GCLOCK: A Non-blocking Buffer Management Based on the Generalized CLOCK", Proceedings fo the 26th International Conference on Data Engineering (ICDE), Mar. 1-6, 2010, pp. 1-12, IEEE, United States.

(Continued)

*Primary Examiner* — Yong Choe
(74) *Attorney, Agent, or Firm* — Sherman IP LLP; Kenneth L. Sherman; Hemavathy Perumal

(57) ABSTRACT

One embodiment provides an eviction system for dynamically-sized caching comprising a non-blocking data structure for maintaining one or more data nodes. Each data node corresponds to a data item in a cache. Each data node comprises information relating to a corresponding data item. The eviction system further comprises an eviction module configured for removing a data node from the data structure, and determining whether the data node is a candidate for eviction based on information included in the data node. If the data node is not a candidate for eviction, the eviction module inserts the data node back into the data structure; otherwise the eviction module evicts the data node and a corresponding data item from the system and the cache, respectively. Data nodes of the data structure circulate through the eviction module until a candidate for eviction is determined.

28 Claims, 11 Drawing Sheets

(56) References Cited

U.S. PATENT DOCUMENTS

| | | | |
|---|---|---|---|
| 8,176,258 | B2 | 5/2012 | Wang |
| 8,312,457 | B2 | 11/2012 | Song et al. |
| 2002/0056025 | A1 | 5/2002 | Qiu et al. |
| 2003/0099254 | A1 | 5/2003 | Richter |
| 2003/0165160 | A1 | 9/2003 | Minami et al. |
| 2013/0290643 | A1* | 10/2013 | Lim .................. G06F 17/3048 711/144 |

OTHER PUBLICATIONS

Wiggins, A. et al., "Enhancing the Scalability of Memcached", May 17, 2012, pp. 1-34, Intel Corporation, United States.

Dean, J. et al., "LevelDB: A Fast Persistent Key Value Store", Jul. 27, 2011, pp. 1-6, Google Open Source Blog, United States.

Smith, A.J., "Sequentiality and Prefetching in Database Systems", Proceedings of the ACM Transactions on Database Systems, Sep. 1978, pp. 223-247, vol. 3, No. 3, ACM, United States.

Siberschatz, A. et al., "Operating System Concepts", 2013, pp. 1-994,9 Edition, John Wiley & Sons, Inc., United States.

Nishtala, R. et al., "Scaling Memcache at Facebook", Proceedings of 10th USENIX Symposium on Networked Systems Design and Implementation (NSDI '13), Apr. 2-5, 2013, pp. 385-398, USENIX Association, United States.

Michael, M.M. et al., "Simple, Fast, and Practical Non-Blocking and Blocking Concurrent Queue Algorithms", Proceedings of 15th Annual ACM Symposium on Principles of Distributed Computing (PODC '96), May 1, 1996, pp. 267-275, ACM, United.

Lim, K. et al., "Thin Servers with Smart Pipes: Designing SoC Accelerators for Memcached", Proceedings of the 40th Annual International Symposium on Computer Architecture (ISCA '13), Jun. 23, 2013, pp. 26-47, ACM, United States.

Fan, B. et al., "MemC3: Compact and Concurrent MemCache with Dumber Caching and Smarter Hashing", Proceedings of the 10th USENIX Symposium on Networked Systems Design and Implementation (NSDI '13), Apr. 2013, pp. 1-14, United States.

Corbato, F.J., "A Paging Experiment with the Multics System", In Honor of P.M. Morse, 1969, pp. 217-228, MIT Press, United States.

Atikoglu, B. et al., "Workload Analysis of a Large-Scale Key-Value Store", Proceedings of the 12th ACM Sigmetrics/Performance Joint International Conference on Measurement and Modeling of Computer Systems, Jun. 11, 2012, pp. 53-64, ACM, United States.

Aniszchyk, C., "Caching with Twemcache", Twitter Blog, Engineering Blog, Jul. 10, 2012, pp. 1-7, United States.

Anonyomous, "Memcached", 2009, pp. 1-3, United States [downloaded from http://www.memcached.org/ on Apr. 23, 2015].

Anonymous, Dynamo (storage system), Apr. 2, 2015, pp. 1-3, Wikipedia, United States.

Michael, M.M. et al., "Non-Blocking Algorithms and Preemption-Safe Locking on Multiprogrammed Shared Memory Multiprocessors", Mar. 1997, pp. 1-35, Department of Computer Science, University of Rochester, United States.

\* cited by examiner

↙900

| Object Size (bytes) | NbQ-CLOCK | Bag-LRU | Static CLOCK | LRU |
|---|---|---|---|---|
| | Number of data items stored (millions) | | | |
| 64 | 5.263 | 5.113 | 4.503 | 5.089 |
| 128 | 4.006 | 3.919 | 3.336 | 3.905 |
| 256 | 2.711 | 2.671 | 2.198 | 2.664 |
| 512 | 1.647 | 1.632 | 1.306 | 1.629 |
| 1024 | 0.922 | 0.918 | 0.721 | 0.916 |
| 2048 | 0.491 | 0.489 | 0.380 | 0.489 |
| 4096 | 0.253 | 0.253 | 0.196 | 0.253 |
| | Cache Hit Rate | | | |
| 64 | 82.81% | 82.34% | 81.32% | 82.29% |
| 128 | 80.86% | 80.76% | 80.34% | 80.76% |
| 256 | 78.23% | 78.13% | 77.14% | 78.13% |
| 512 | 75.26% | 75.26% | 74.06% | 75.25% |
| 1024 | 72.20% | 72.05% | 70.90% | 72.07% |
| 2048 | 68.92% | 68.32% | 67.29% | 68.32% |
| 4096 | 65.60% | 64.20% | 63.32% | 64.19% |

FIG. 9

NON-BLOCKING QUEUE-BASED CLOCK REPLACEMENT ALGORITHM

CROSS-REFERENCE TO RELATED APPLICATIONS

This application claims priority to United States (U.S.) Provisional Patent Application Ser. No. 61/856,620, filed on Jul. 19, 2013, which is incorporated herein by reference.

TECHNICAL FIELD

One or more embodiments relate generally to web object caching of variably-sized data items, and in particular, a non-blocking queue-based CLOCK replacement algorithm for dynamically-sized caches.

BACKGROUND

Web object caching is a mechanism for temporarily storing (i.e., caching) web objects, such as HTML pages, image files, audio files and video files, to reduce bandwidth usage, server load, and perceived lag. Web object caches may be used in various systems (e.g., search engines, content websites, shopping websites, etc.) by Internet-based service providers.

SUMMARY

One embodiment provides an eviction system for dynamically-sized caching comprising a non-blocking data structure for maintaining one or more data nodes. Each data node corresponds to a data item in a cache. Each data node comprises information relating to a corresponding data item. The eviction system further comprises an eviction module configured for removing a data node from the data structure, and determining whether the data node is a candidate for eviction based on information included in the data node. If the data node is not a candidate for eviction, the eviction module inserts the data node back into the data structure, otherwise the eviction module evicts the data node and a corresponding data item from the system and the cache, respectively. The data nodes of the data structure circulate through the eviction module until a candidate for eviction is determined.

These and other aspects and advantages of one or more embodiments will become apparent from the following detailed description, which, when taken in conjunction with the drawings, illustrate by way of example the principles of one or more embodiments.

BRIEF DESCRIPTION OF THE DRAWINGS

For a fuller understanding of the nature and advantages of one or more embodiments, as well as a preferred mode of use, reference should be made to the following detailed description read in conjunction with the accompanying drawings, in which:

FIG. 9 is a table 900 including cache hit rates for different replacement algorithms including the non-blocking queue-based CLOCK replacement algorithm, in accordance with an embodiment.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Figure 1:
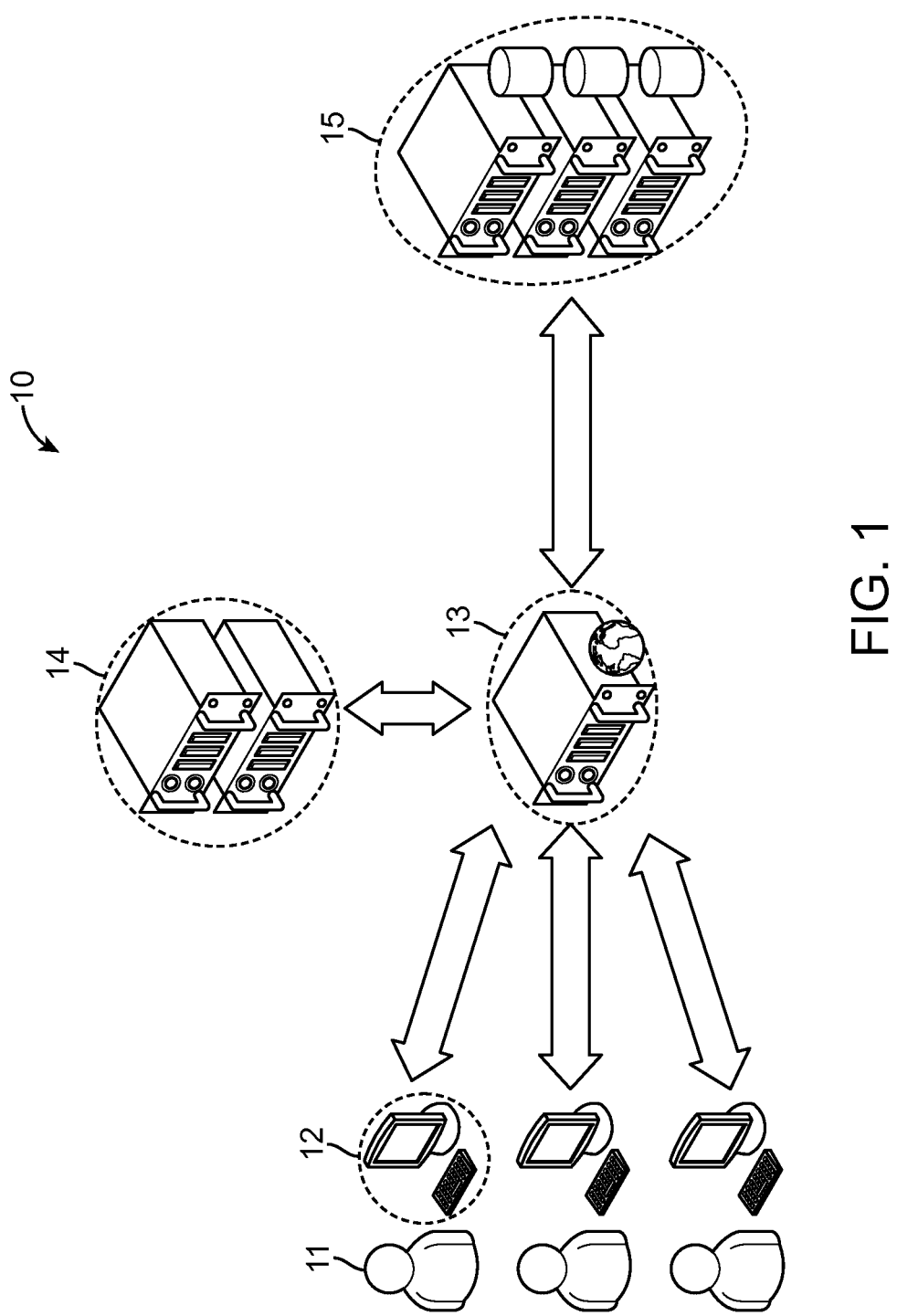
FIG. 1 illustrates a block diagram of an example networked system.

FIG. 1 illustrates a block diagram of an example networked system 10. The networked system 10 comprises at least one client device 12. A client device 12 represents an electronic device of a user client 11. An electronic device may be an appliance (e.g., a television (TV) such as a smart TV), a personal computer (PC), a server, or a mobile device (e.g., a mobile phone such as a smart phone, a laptop computer, a tablet).

A user client 11 may request an Internet-based service (e.g., a Web service) and/or content (e.g., web page, image file, audio file, video file, etc.) from an Internet-based service provider via a client device 12. A client device 12 may send a request for an Internet-based service and/or content to a front-end web server 13 of an Internet-based service provider over a connection (e.g., a wireless connection, a wired connection, or a combination of the two).

To reduce network traffic and user access times to Internet-based services and/or content, an Internet-based service provider may utilize web object caching. For example, an Internet-based service provider may utilize one or more in-memory key-value stores 14 for caching data items (e.g., web objects) that are frequently accessed by its user clients 11.

An example in-memory key-value store 14 is Memcached. Memcached typically serves as a cache for slower and larger backing non-volatile storage. Memcached operates purely in memory and consists of a hash table, coupled with a replacement algorithm, for caching data items. Memcached may be distributed over one or more local servers of the Internet-based service provider.

When a front-end web server 13 receives a request from a client device 12, the front-end web server 13 first attempts to resolve the request using one or more in-memory key-value stores 14, such as local servers running Memcached. A Memcached instance running on a single local server may comprise multiple worker threads for satisfying hash table requests, such as the GET request for obtaining a data item from the hash table, the DELETE request for deleting a data item from the hash table, the ADD request for adding and caching a new data item to the hash table, and the REPLACE request for replacing a data item in the hash table.

A cache miss occurs when a requested data item is not cached in the in-memory key-value store 14 used to resolve the request. When a cache miss occurs, the front-end web server 13 forwards the request to a back-end server 15 to resolve the request. Upon receiving a response to the request from the back-end server 15, the front-end web server 13 updates the in-memory key-value store 14 by adding any missing data item included in the response to the hash table. The front-end web server 13 then constructs and sends a final response to the client device 12 that the request originated from.

When an ADD request or a REPLACE request encounters an in-memory key-value store 14 that is full, an eviction operation based on a replacement algorithm is triggered to evict at least one data item from the in-memory key-value store 14, thereby allowing caching of new incoming data items. An example replacement algorithm is the Least Recently Used (LRU) algorithm. The LRU algorithm evicts the least recently accessed data item based on a list of data items ordered based on access time.

CLOCK is an example memory-page replacement algorithm that is a derivative of the LRU algorithm. A memory page is typically a 4 KB aligned region of memory.

Figure 2:
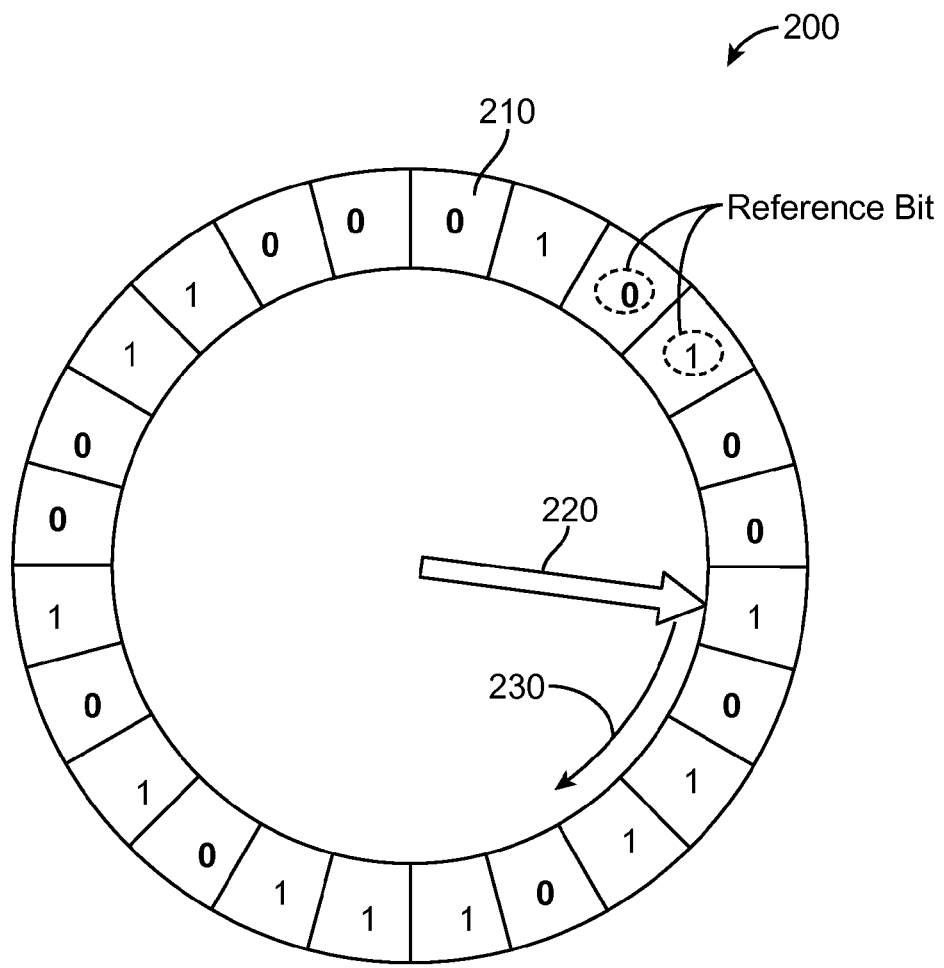
FIG. 2 illustrates an example implementation of the CLOCK replacement algorithm.

FIG. 2 illustrates an example implementation of the CLOCK replacement algorithm. The CLOCK replacement algorithm maintains a statically allocated circular buffer 200. The CLOCK replacement algorithm only requires a single bit per cache entry. Specifically, each element 210 of the buffer comprises a reference bit for a corresponding memory page.

A reference bit for a corresponding memory page is used to indicate whether the memory page was recently accessed. A non-zero reference bit indicates that a corresponding memory page was recently accessed, whereas a zero reference bit indicates that a corresponding memory page was not recently accessed. A reference bit for a corresponding memory page is set each time the memory page is accessed.

The CLOCK replacement algorithm maintains a buffer pointer ("clock hand") 220. When an eviction operation is triggered, a clock sweep of the buffer 200 is initiated. Specifically, the clock hand 220 iterates through the buffer 200 along a first direction 230 (e.g., clockwise direction). As the clock hand 220 iterates through the buffer 200, each non-zero reference bit that the clock hand 220 encounters is set to a zero reference bit. The clock hand 220 iterates through the buffer 200 until the clock hand 220 encounters a zero reference bit. A memory page corresponding to the zero reference bit is then evicted. The CLOCK replacement algorithm only keeps track of memory page usage over the last clock sweep interval.

As the CLOCK replacement algorithm only requires a single bit per cache entry, the CLOCK replacement algorithm is unable to differentiate a data item with higher access frequency (e.g., a data item that is accessed multiple times) from a data item with lower access frequency (e.g., a data item that is accessed only once).

A generalized CLOCK replacement algorithm is a variant/derivative of the CLOCK replacement algorithm. Instead of maintaining a buffer of reference bits, the generalized CLOCK replacement algorithm maintains a buffer of reference counters, wherein each reference counter tracks the number of times a corresponding memory page has been accessed.

Embodiments of the invention provide a non-blocking (i.e., lock-free) queue-based variant of the generalized CLOCK replacement algorithm.

Figure 3A:
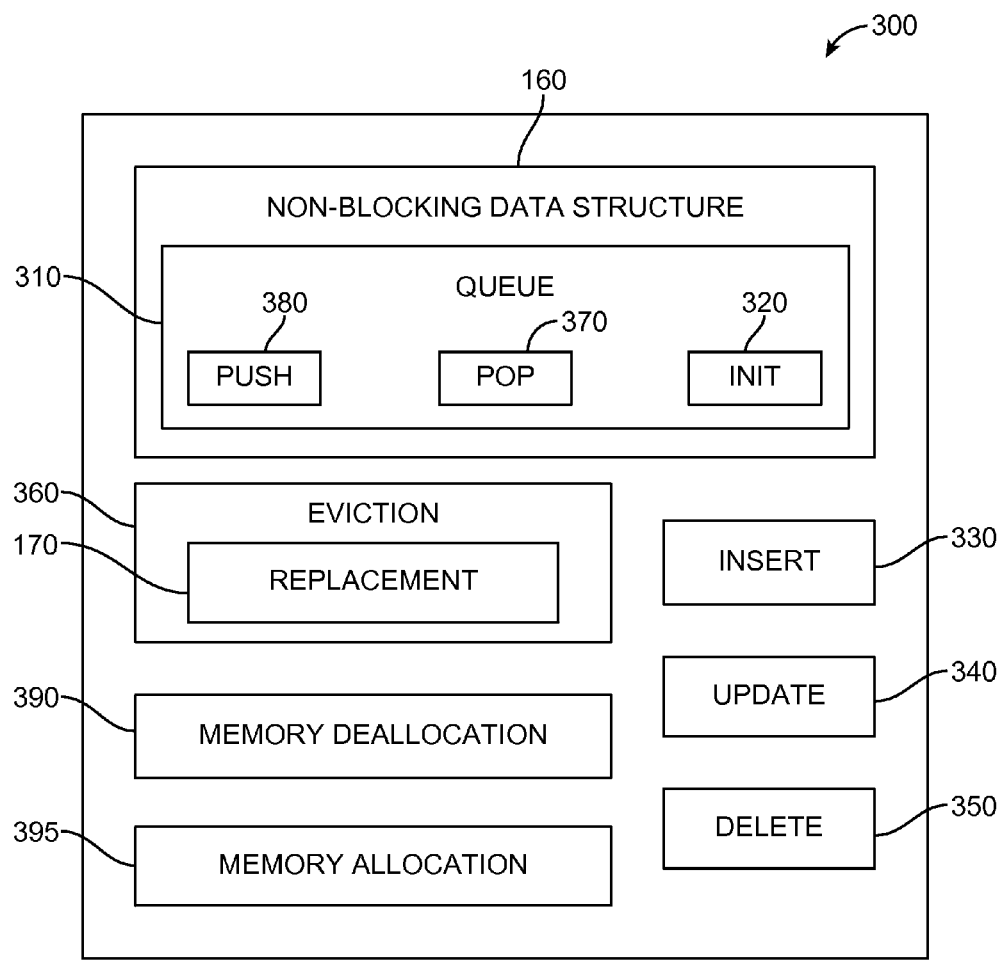
FIG. 3A illustrates an example eviction system for implementing a non-blocking queue-based variant of the generalized CLOCK replacement algorithm, in accordance with an embodiment of the invention.

FIG. 3A illustrates an example eviction system 300 for implementing a non-blocking queue-based variant of the generalized CLOCK replacement algorithm, in accordance with an embodiment of the invention. The eviction system 300 serves a cache (e.g., Memcached). The eviction system 300 comprises a non-blocking data structure 160, an insert module 330, an update module 340, a delete module 350, an eviction module 360, a memory deallocation module 390, and a memory allocation module 395.

Figure 4:
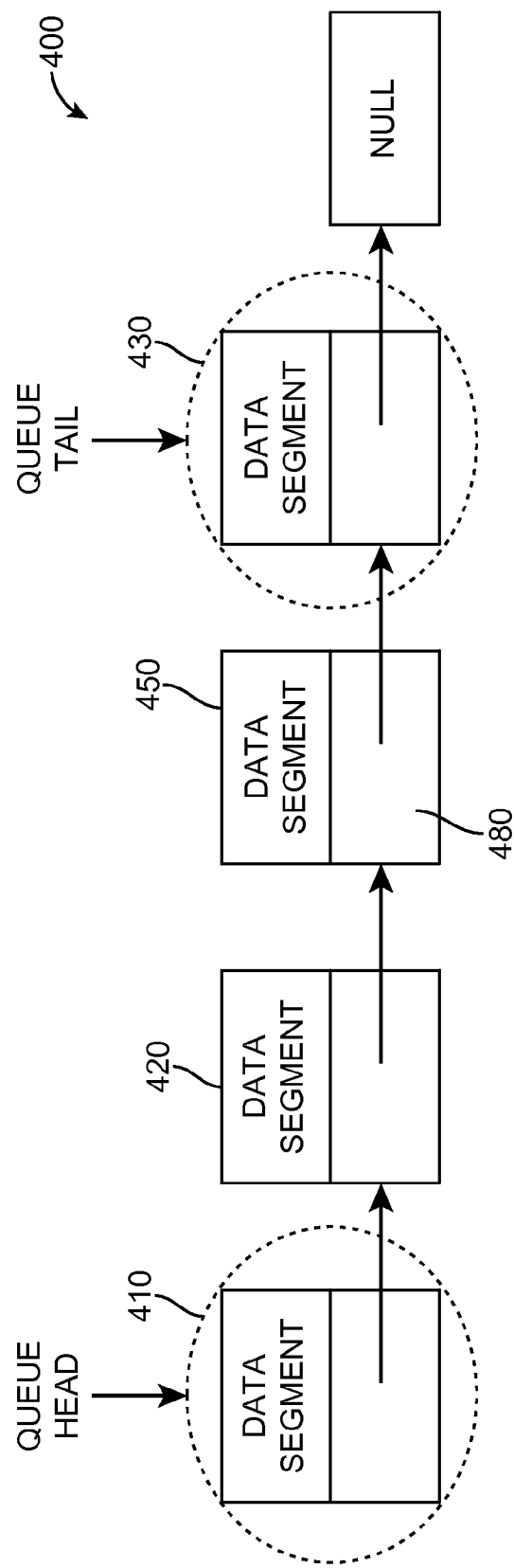
FIG. 4 illustrates an example singly-linked list, in accordance with an embodiment of the invention.

In one embodiment, the non-blocking data structure 160 comprises a queue 310 for storing and keeping track of data items or references thereof. The queue 310 is a concurrent and lock-free queue. In one embodiment, the queue 310 comprises a singly-linked list 400 (FIG. 4). Each element of the queue 310 is a data node 420 (FIG. 4).

Each cached data item in the cache has a corresponding data node 420 in the queue 310. Each data node 420 for each cached data item comprises a data segment 450 (FIG. 5) that includes either a reference to the cached data item or the cached data item itself. In one embodiment, the reference to the cached data item is a pointer 550 (FIG. 5) to the cached data item. Each data node 420 for each cached data item further comprises overhead information relating to the cached data item.

The queue 310 has a pair of opposing ends: a first end representing a queue head 410 (FIG. 4), and a second end representing a queue tail 430 (FIG. 4). Data nodes 420 are removed from the queue 310 at the queue head 410. Data nodes 420 are added to the queue 310 at the queue tail 430. In this specification, let the terms push and pushing denote adding a data node 420 to the queue 310, wherein the data node 420 is added at the queue tail 430. Let the terms pop and popping denote removing a data node 420 from the queue 310, wherein the data node 420 is removed from the queue head 410.

Figure 5:
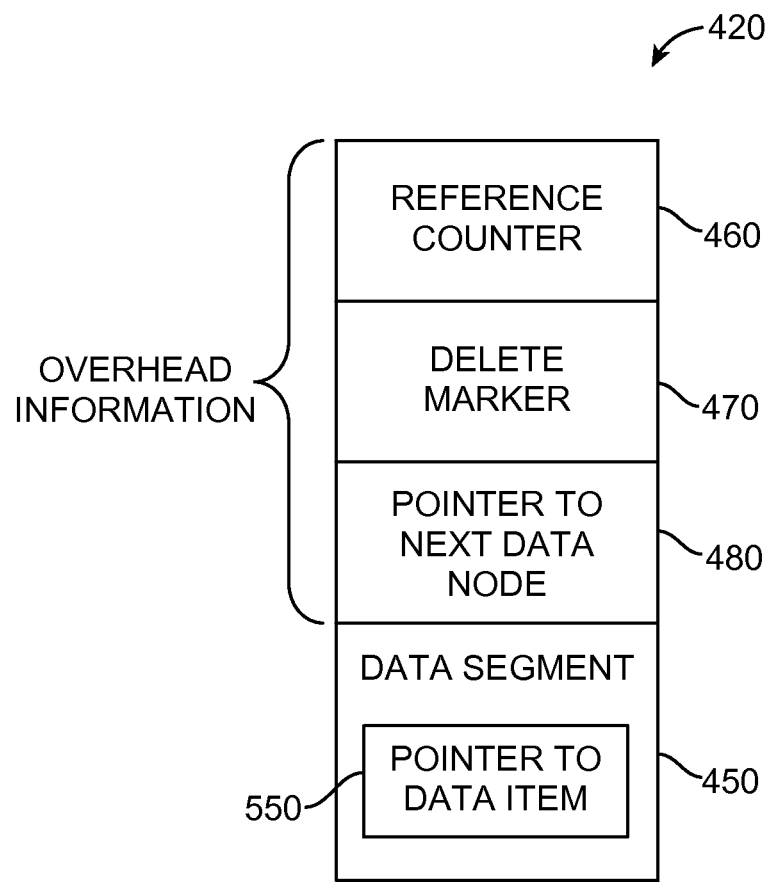
FIG. 5 illustrates an example queue node, in accordance with an embodiment of the invention.

The eviction system 300 conserves memory usage by minimizing/reducing the amount of overhead information contained within each data node 420 (FIG. 5). In one embodiment, overhead information relating to a cached data item comprises data identifying the frequency at which the cached data item is accessed ("access frequency data"), data identifying whether the cached data item has been flagged for deletion/removal from the cache ("delete marker data"), and a pointer to a next data node. If a data node 420 is the last data node 420 of the queue 310, its pointer to a next data node is set to NULL. If a data node 420 is not the last data node 420 of the queue 310, its pointer to a next data node is set to point to another data node 420 of the queue 310.

Unlike the statically allocated circular buffer 200 in FIG. 2, the queue 310 is an unbounded queue (i.e., the queue 310 is not restricted to maintaining a fixed number of elements/entries). As such, the cache (e.g., Memcached) served by the eviction system 300 may be a dynamically-sized cache. The cache may contain a variable number of data items with different sizes.

The queue 310 further comprises an INIT module 320, a POP module 370 and a PUSH module 380. Each module 320, 370 and 380 handles a corresponding queue operation. Specifically, the INIT module 320 is configured to perform an INIT operation that initializes the queue 310. The POP module 370 is configured to perform a POP operation that pops a data node 420 from the queue 310 (i.e., remove a data node 420 at the queue head 410 from the queue 310). The PUSH module 380 is configured to perform a PUSH operation that pushes a data node 420 into the queue 310 (i.e., add a data node 420 to the queue 310 at the queue tail 430).

The memory allocation module 395 of the eviction system 300 allocates memory for a data node 420 for a cached data item. The memory allocated per cached data item is for a corresponding data node 420 and possibly the data item itself. The memory deallocation module 390 of the eviction system 300 deallocates/frees memory when a data node 420 for a cached data item is removed permanently from the queue 310.

In this specification, let the terms evict, evicting and eviction denote removing a data item from the cache. As described in detail later herein, the eviction module 360 is configured to perform an eviction operation during which a data node 420 is evicted from the queue 310.

Neither memory allocation nor memory deallocation occurs when a PUSH operation, a POP operation, or an INIT operation is performed. Memory is not allocated each time a data node 420 is pushed/added to the queue 310 during a PUSH operation. Memory is not deallocated/freed each time a data node 420 is popped/removed from the queue 310 during a POP operation. As no memory allocation and no memory deallocation occurs during any queue operation, the queue 310 does not require any internal dynamic memory management. This makes the queue operations simpler, faster, and fully lock-free. As described in detail later herein, memory is allocated for a data node 420 when the data node 420 is inserted into the queue 310 for the first time (e.g., when a corresponding data item is added to the cache). Memory is deallocated/freed from a data node 420 when the data node 420 is evicted and/or removed permanently from the queue 310 (e.g., when a corresponding data item is deleted from the cache).

M. M. Michael and M. L. Scott, in the publication "Simple, fast, and practical non-blocking and blocking concurrent queue algorithms", published in "Proceedings of the 15th Annual ACM Symposium on Principles of Distributed Computing" (1996), pages 267-275, describe non-blocking queue algorithms.

Table 1 below provides example pseudo code for implementing the INIT operation. The example pseudocode provided in Table 1 is based on non-blocking queue algorithms described in the above-referenced publication by M. M. Michael and M. L. Scott.

TABLE 1

```
void init (Node *node) {
    Q->head = Q->tail = node;
    Q->head->next = NULL;
}
```

Table 2 below provides example pseudo code for implementing the PUSH operation. The example pseudocode provided in Table 2 is based on non-blocking queue algorithms described in the above-referenced publication by M. M. Michael and M. L. Scott.

TABLE 2

```
void push(Node *node ) {
    node->next = NULL;
    while (true) {
        tail = Q->tail;
        next = tail->next;
        if (tail == Q->tail) {
            if (next == NULL) {
                if (CAS(&tail->next, next, node) == next)
                    break;
            }
        } else {
            CAS(&Q->tail, tail, next);
        }
    }
    CAS(&Q->tail, tail , node);
}
```

Table 3 below provides example pseudo code for implementing the POP operation. The example pseudocode provided in Table 3 is based on non-blocking queue algorithms described in the above-referenced publication by M. M. Michael and M. L. Scott.

TABLE 3

```
data_t pop( ) {
    data_t result;
    while (true) {
        head = Q->head;
        tail = Q->tail;
        next = head->next;
        if (head == Q->head) {
            if (head == tail) {
                if (next == NULL) {
                    return NULL;
                }
                CAS(Q->tail, tail, next);
            } else {
                if (next == NULL) {
                    continue;
                }
                result = next->desc;
                if (CAS(Q->head, head, next)) {
                    break;
                }
            }
        }
    }
    head->desc = result;
    return head;
}
```

Unlike the non-blocking queue algorithms described in the above-referenced publication by M. M. Michael and M. L. Scott, the example pseudocode provided in Tables 2-3 above do not include function calls for memory allocation or memory deallocation. Further, the PUSH and POP operations implemented using the example pseudocode provided in Tables 2-3 above return a queue node (i.e., a data node 420) instead of a data item.

The example pseudo code provided in Tables 2-3 above utilize Compare-And-Swap (CAS). CAS is an atomic operation that compares the contents of a CPU register with contents of a memory location and, if the contents match, fills the memory location with a user-supplied value. If a swap occurred, CAS returns a true; otherwise, CAS returns a false. CAS operates atomically; the contents of the memory location cannot change at any point during the operation due to another executing thread.

As shown in Table 2, CAS is used during the PUSH operation to atomically append a data node 420 at the tail end of the queue 310, and to update the queue tail 430 so that it points to the appended data node 420. As shown in Table 3, CAS is also used during the POP operation to update the queue tail 430 and the queue head 410 after a data node 420 at the queue head 410 is popped. The PUSH operation and POP operation will retry CAS if the return value of CAS is false; the false return value indicates that the current thread's local copy of the queue tail 430 or the queue head 410 is stale because another thread has modified the queue 310.

As the queue 310 is a concurrent and lock-free queue, multiple worker threads may push and pop nodes 420 from the list 400 with no lock contention. The eviction system 300 thereby facilitates parallelism and concurrency when serving requests, and enables scalable and low-latency operations.

The update module 340 updates access frequency data in a data node 420 each time a corresponding data item is accessed.

When the eviction system 300 receives a request to delete/remove a data item from the cache, the delete module 350 sets the delete marker data 470 (FIG. 5) in a data node 420 for the data item. Memory associated with the data node 420 and the data item, however, is not immediately deallocated/freed. Memory associated with the data node 420 and the data item is deallocated/freed only after the eviction module 360 evicts the data node 420 from the queue 310. Adding delete marker data to each data node 420 thereby supports arbitrary data item deletions.

When the eviction system 300 receives a request to insert a new data item in the cache, the insert module 330 generates a data node 420 for the data item. Specifically, the insert module 330 utilizes the memory allocation module 395 to allocate memory for a data node 420 for the data item. The data node 420 may include the data item itself or a reference to the data item (e.g., a pointer to the data item). The insert module 330 then pushes the data node 420 into the queue 310 by applying a PUSH operation.

The eviction module 360 is configured to perform an eviction operation based on a replacement algorithm 170 that is a non-blocking queue-based variant of the generalized CLOCK replacement algorithm.

Figure 3B:
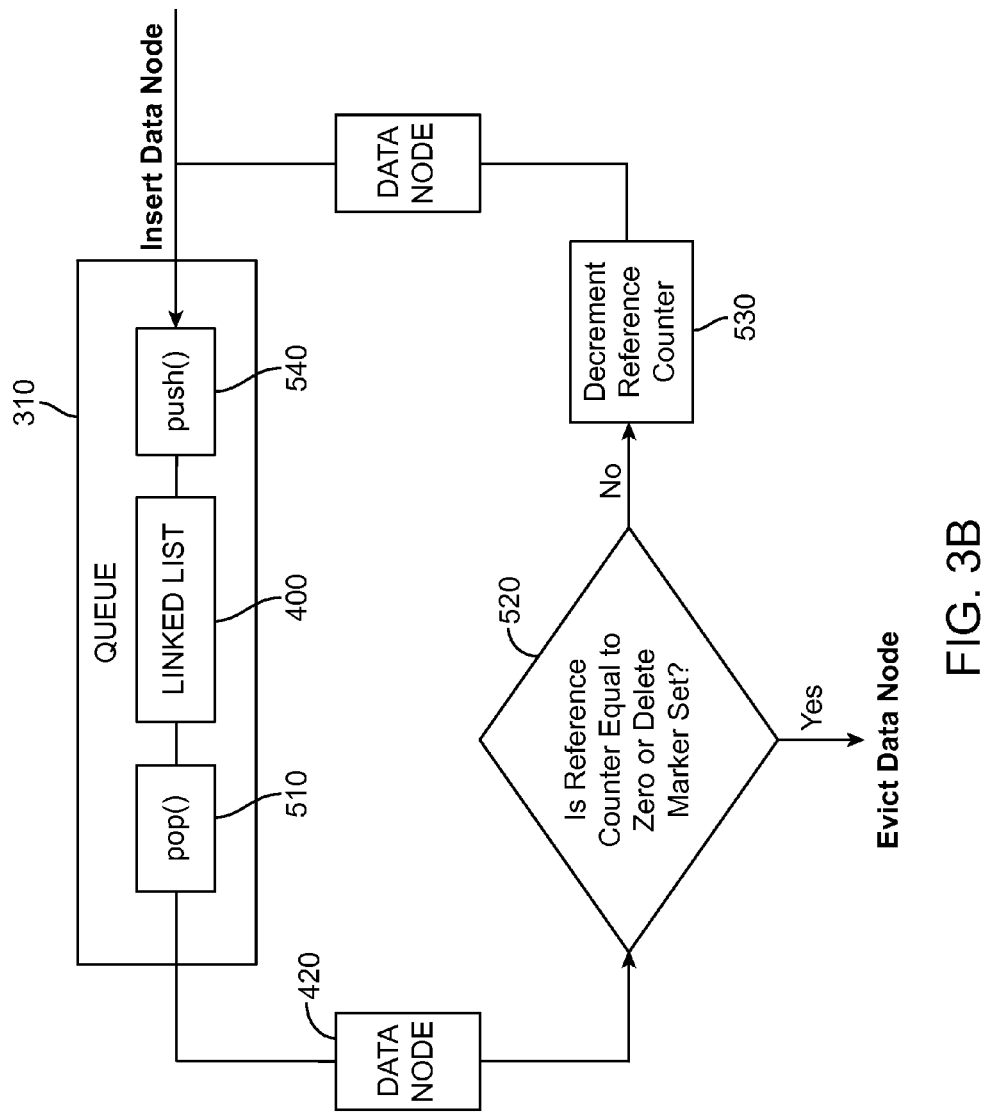
FIG. 3B illustrates an example process flow during an eviction operation, in accordance with an embodiment of the invention.

FIG. 3B illustrates an example process flow during an eviction operation, in accordance with an embodiment of the invention. Unlike the CLOCK replacement algorithm and variants of the CLOCK replacement algorithm (e.g., the generalized CLOCK replacement algorithm) that iterate over a fixed list of reference bits/counters, the eviction module 360 implements an eviction operation that circulates data nodes 420 for data items through eviction logic.

Specifically, during an eviction operation, the eviction module 360 applies the POP operation to pop a data node 420 at the queue head 410 of the queue 310, as represented by process 510. The eviction module 360 then determines whether the popped data node 420 is a candidate for eviction based on access frequency data and delete marker data included in the data node 420, as represented by process 520. In one embodiment, access frequency data in a data node 420 comprises a reference counter 460 (FIG. 5) that tracks the number of times a corresponding data item has been accessed. Delete marker data in a data node 420 comprises a delete marker 470 (FIG. 5) that is set when the eviction system 300 receives a request to delete a corresponding data item from the cache. A data node 420 is a candidate for eviction when one of the following conditions is satisfied: 1) a reference counter 460 of the data node 420 is equal to a pre-defined/predetermined value (e.g., zero), or 2) a delete marker 470 of the data node 420 is set (e.g., set by the delete module 350).

If a data node 420 is a candidate for eviction, the eviction module 360 does not re-insert (i.e., push) the data node 420 into the queue 310. Instead, the eviction module 360 uses the memory deallocation module 390 to deallocate/free memory associated with the evicted data node 420 and possibly its corresponding data item. If a data node 420 is not a candidate for eviction, the eviction module 360 decrements the reference counter 460 of the data node 420, as represented by process 530. As represented by process 540, the eviction module 360 then re-inserts the data node 420 into the queue 310 by applying a PUSH operation to push the data node 420 back into the queue 310 at the queue tail 430, thereby recycling the data node 420 back to the queue 310. The eviction module 360 reiterates the process of popping and pushing nodes 420 until it encounters a data node 420 that is a candidate for eviction. As no memory allocation and no memory deallocation occurs during either a PUSH operation or a POP operation, only a single memory deallocation is incurred during each eviction operation performed by the eviction module 360 (i.e., memory is deallocated only when the eviction module 360 evicts a data node 420 that is a candidate for eviction).

By circulating data nodes 420 for cached data items instead of iterating through the cached items, the eviction system 300 does not explicitly maintain a variable representing a clock hand. Instead, the queue head 410 of the queue 310 implicitly represents the clock hand.

The eviction operation may be executed proactively (e.g., periodically) or reactively. Proactive evictions may occur at periodic intervals. The periodic intervals may be automatically adjusted up to a minimum value based on the workload of the eviction system 300. Reactive evictions may occur when an ADD request or a REPLACE request is received for a cache (e.g., Memcached) that is full (i.e., all memory available to the cache has been used up). The eviction system 300 supports both proactive evictions and reactive evictions. For example, a thread executing the eviction operation may be triggered periodically. As another example, a thread servicing an ADD request or a REPLACE request may execute the eviction operation when the cache is full.

FIG. 4 illustrates an example singly-linked list 400, in accordance with an embodiment of the invention. The queue 310 includes the singly-linked list 400 of data nodes 420.

FIG. 5 illustrates an example data node 420, in accordance with an embodiment of the invention. Each data node 420 for each data item comprises a data segment 450 that includes the data item itself or a reference pointer 550 to the data item. Each data node 420 for each data item further comprises overhead information relating to the data item. In one embodiment, overhead information relating to a data item includes at least one of the following: a reference counter 460 that tracks the number of times the data item has been accessed, a delete marker 470 representing a binary flag that is set when a request to delete the data item is received, and a pointer 480 to a next data node 420. If a data node 420 is not the last data node 420 of the queue 310, the pointer 480 is set to point to another data node 420 of the queue 310. If the data node 420 is the last data node 420 of the queue 310, the pointer 480 is set to NULL.

The update module 340 increments a reference counter 460 in a data node 420 each time a corresponding data item is accessed.

The delete module 350 sets a delete marker 470 in a data node 420 when a request to delete a corresponding data item is received.

In one embodiment, overhead information contained within a data node 420 requires only 10 bytes of data. Maintaining small overhead information for each data item allows more room for storing data items (e.g., key/value pairs), thereby contributing to a higher cache hit rate (i.e., higher likelihood of satisfying a GET request).

The queue 310 does not require any internal dynamic memory management. This allows for the queue 310 to be embodied in hardware much more simply than another data structure containing internal dynamic memory management.

Figure 6:
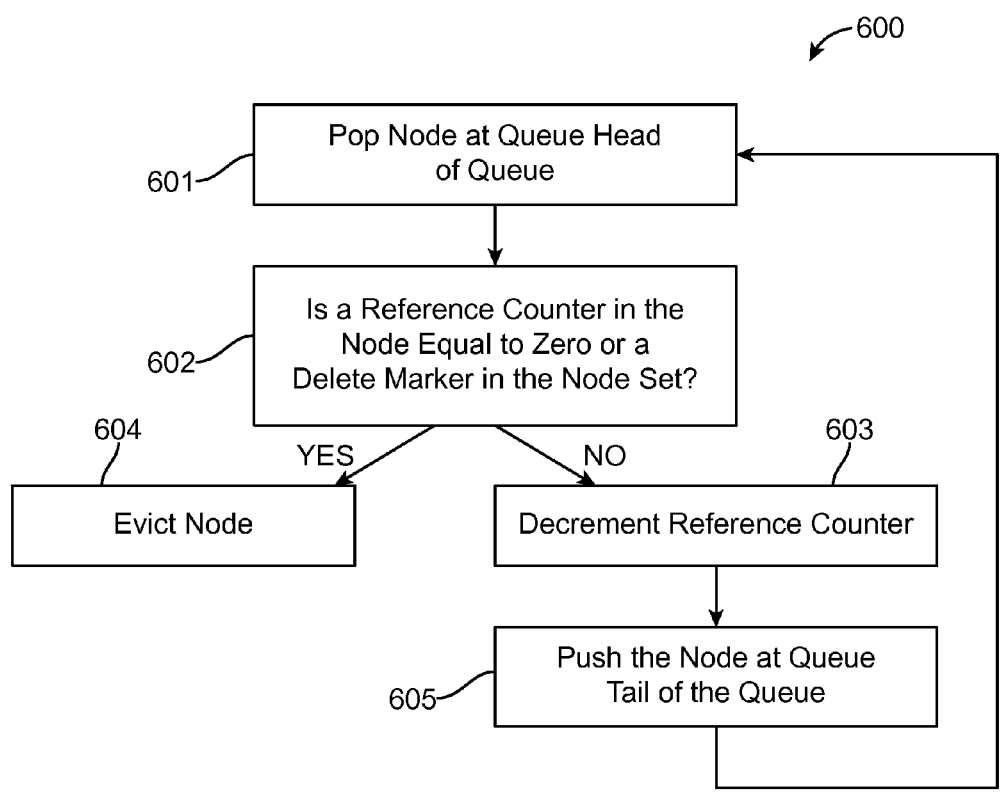
FIG. 6 illustrates an example flow chart for implementing an eviction operation using a non-blocking queue, in accordance with an embodiment.

FIG. 6 illustrates an example flow chart 600 for implementing an eviction operation using a non-blocking queue, in accordance with an embodiment. In process block 601, pop a node at a queue head of the queue. In process block 602, determine if a reference counter contained in the node is equal to zero or a delete marker in the node is set.

If either the reference counter is equal to zero or the delete marker is set, proceed to process block 604 where the node is evicted.

If neither the reference counter is equal to zero nor the delete marker is set, proceed to process block 603 where the reference counter is decremented. In process block 605, the node is pushed back into the queue at the queue tail of the queue. After process block 605, return to process block 601 where another node at the queue head of the queue is popped.

Figure 7:
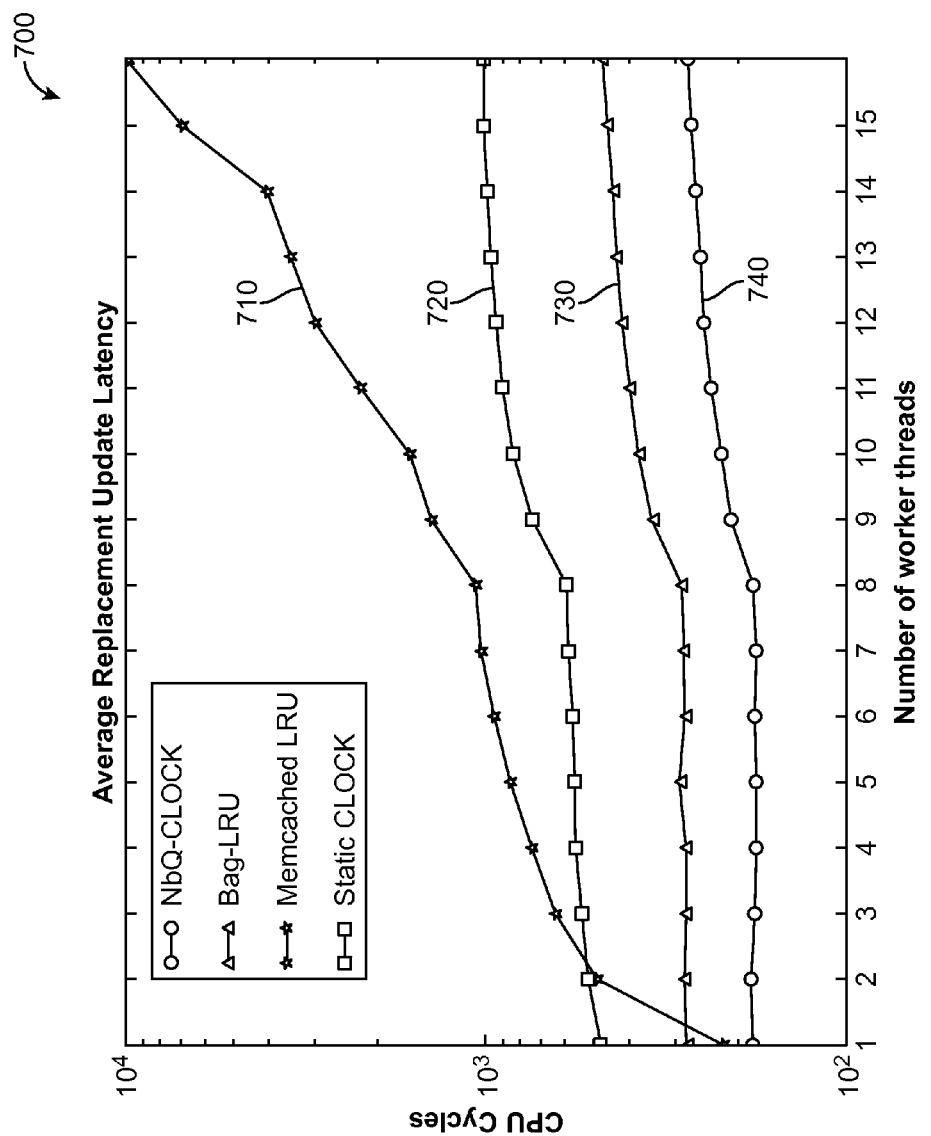
FIG. 7 is a graph 700 illustrating average latency for different replacement algorithms including the non-blocking queue-based CLOCK replacement algorithm, in accordance with an embodiment.

FIG. 7 is a graph 700 illustrating average latency for different replacement algorithms including the non-blocking queue-based CLOCK replacement algorithm, in accordance with an embodiment. A first graph plot 710 represents the average latency when updating access frequency data for a cached data item under a Memcached Least Recently Used replacement algorithm ("Memcached LRU"). A second graph plot 720 represents the average latency when updating access frequency data for a cached data item under a static CLOCK replacement algorithm ("Static CLOCK"). A third graph plot 730 represents the average latency when updating access frequency data for a cached data item under a Bag Least Recently Used replacement algorithm ("Bag-LRU"). A fourth graph plot 740 represents the average latency when updating access frequency data for a cached data item under the non-blocking queue-based CLOCK replacement algorithm ("NbQ-CLOCK"). The non-blocking queue-based CLOCK replacement algorithm scales better compared to the other replacement algorithms shown in FIG. 7.

Figure 8:
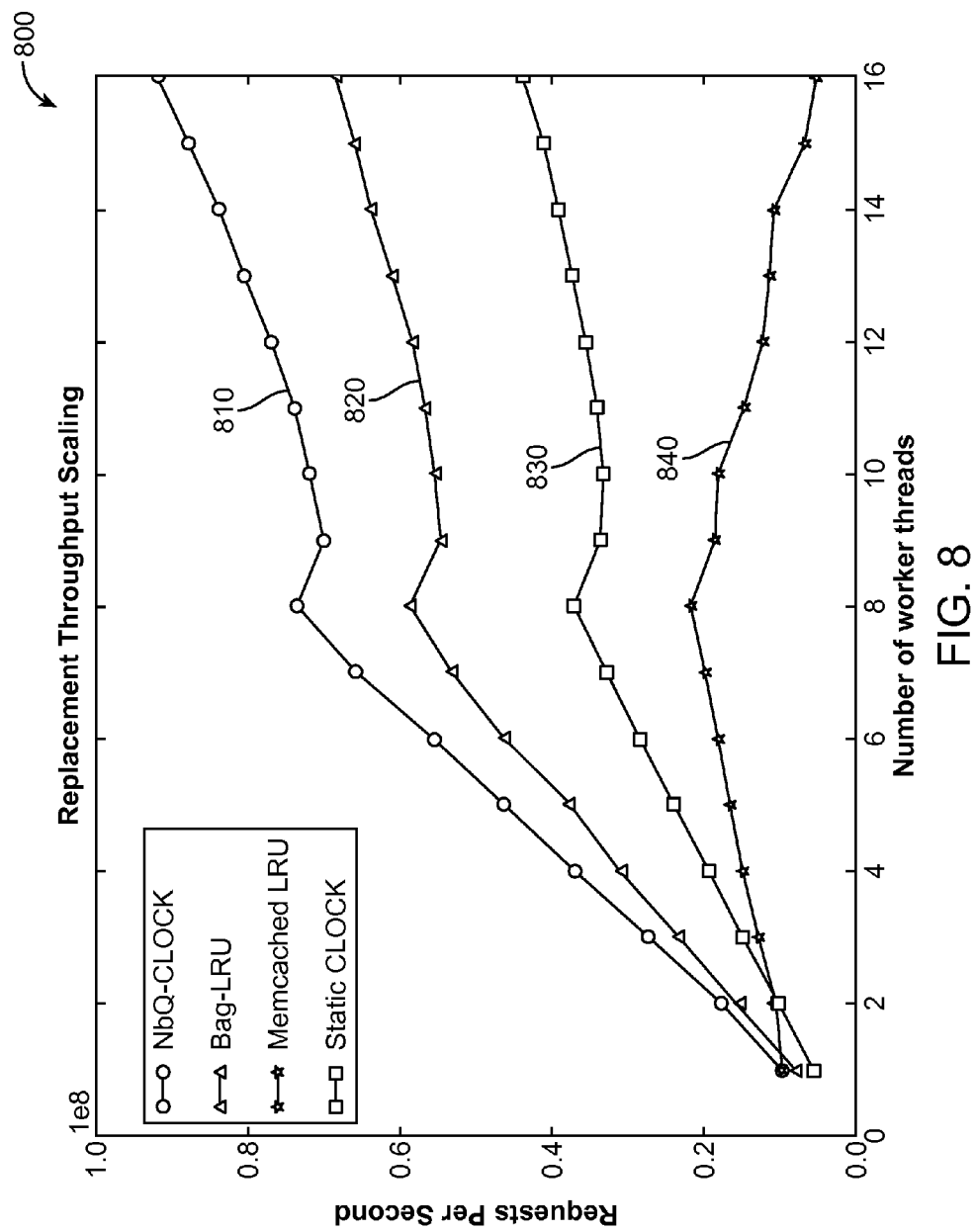
FIG. 8 is a graph 800 illustrating throughput for different replacement algorithms including the non-blocking queue-based CLOCK replacement algorithm, in accordance with an embodiment.

FIG. 8 is a graph 800 illustrating throughput for different replacement algorithms including the non-blocking queue-based CLOCK replacement algorithm, in accordance with an embodiment. In this specification, throughput is defined as the amount of time spent in replacement algorithm operations divided by the number of cache request received. A first graph plot 810 represents the throughput for the non-blocking queue-based CLOCK replacement algorithm ("NbQ-CLOCK"). A second graph plot 820 represents the throughput for a Bag Least Recently Used replacement algorithm ("Bag-LRU"). A third graph plot 830 represents the throughput for a static CLOCK replacement algorithm ("Static CLOCK"). A fourth graph plot 840 represents the throughput for a Memcached Least Recently Used replacement algorithm ("Memcached LRU"). The non-blocking queue-based CLOCK replacement algorithm scales better compared to the other replacement algorithms shown in FIG. 8.

FIG. 9 is a table 900 including cache hit rates for different replacement algorithms including the non-blocking queue-based CLOCK replacement algorithm, in accordance with an embodiment. Table 900 specifically includes the cache hit rates for the non-blocking queue-based CLOCK replacement algorithm ("NbQ-CLOCK"), the Bag Least Recently Used replacement algorithm ("Bag-LRU"), the static CLOCK replacement algorithm ("Static CLOCK"), and the Memcached Least Recently Used replacement algorithm ("Memcached LRU"). As shown in Table 900, the cache hit rates of the non-blocking queue-based CLOCK replacement algorithm is at least as good as those of the other replacement algorithms.

Figure 10:
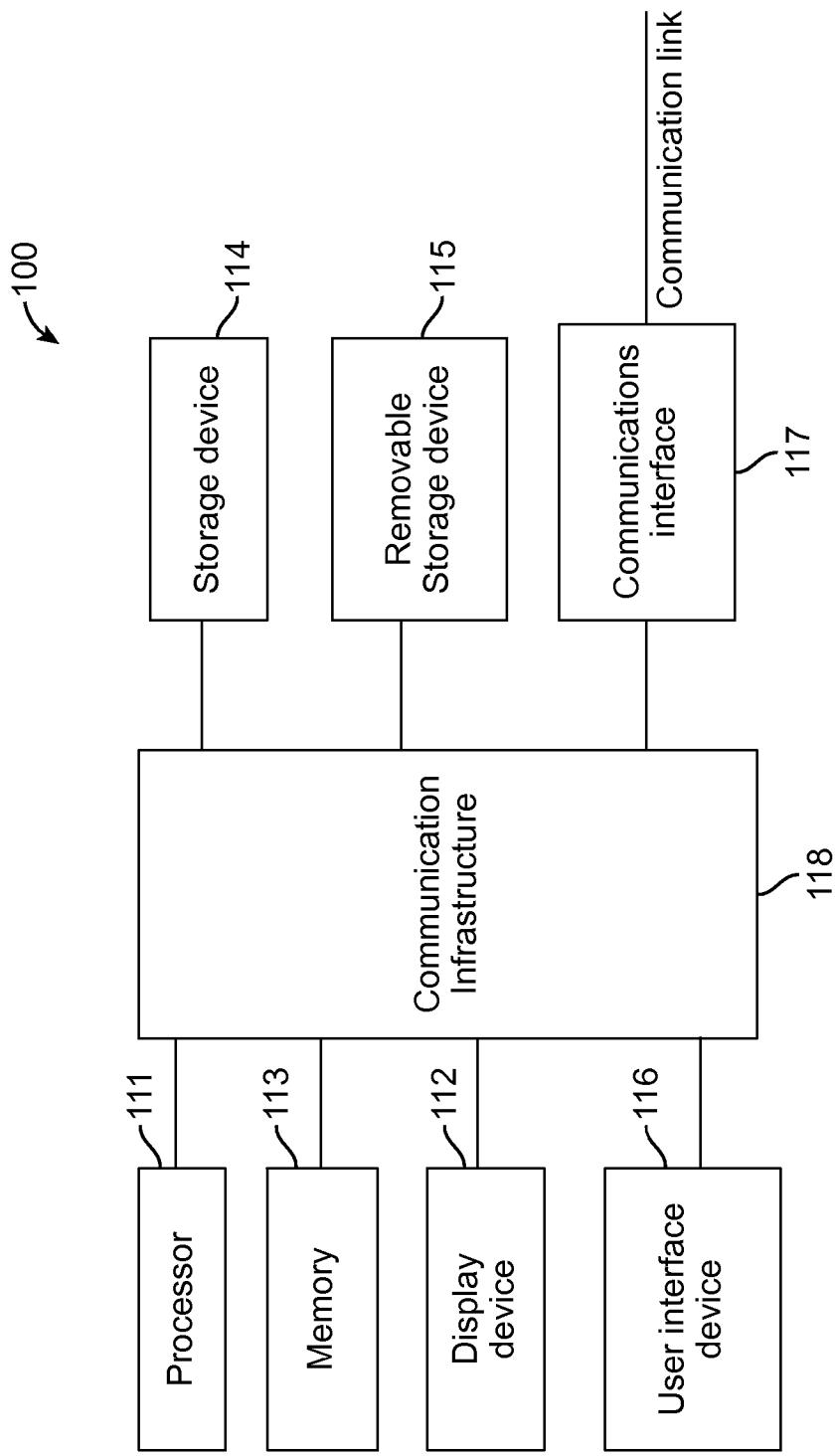
FIG. 10 is a high level block diagram showing an information processing system comprising a computer system useful for implementing an embodiment of the present invention.

FIG. 10 is a high level block diagram showing an information processing system comprising a computer system 100 useful for implementing an embodiment of the present invention. The computer system 100 includes one or more processors 111, and can further include an electronic display device 112 (for displaying graphics, text, and other data), a main memory 113 (e.g., random access memory (RAM)), storage device 114 (e.g., hard disk drive), removable storage device 115 (e.g., removable storage drive, removable memory module, a magnetic tape drive, optical disk drive, computer readable medium having stored therein computer software and/or data), user interface device 116 (e.g., keyboard, touch screen, keypad, pointing device), and a communication interface 117 (e.g., modem, a network interface (such as an Ethernet card), a communications port, or a PCMCIA slot and card). The communication interface 117 allows software and data to be transferred between the computer system and external devices. The system 100 further includes a communications infrastructure 118 (e.g., a communications bus, network) to which the aforementioned devices/modules 111 through 117 are connected.

Information transferred via communications interface 117 may be in the form of signals such as electronic, electromagnetic, optical, or other signals capable of being received by communications interface 117, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, web servers, etc. Further, embodiments of said architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of one or more embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the one or more embodiments have been described with reference to certain versions thereof; however, other versions are possible. Therefore, the spirit and scope of the appended claims should not be limited to the description of the preferred versions contained herein.

What is claimed is:

1. An eviction system for dynamically-sized caching, comprising:
    at least one processor; and
    a non-transitory processor-readable memory device storing instructions that when executed by the at least one processor causes the at least one processor to perform operations including:
        removing a data node from a queue of a non-blocking data structure maintaining one or more data nodes, wherein the data node corresponds to a data item a cache, and the data node comprises information relating to the data item and indicative of frequency at which the data item is accessed;
        determining whether the data node is a candidate for eviction based on the information included in the data node; in response to determining the data node is a candidate for eviction, inserting the data node back into the queue; and
        in response to determining the data node is a candidate for eviction, evicting the data node and the data item from the non-blocking data structure and the cache, respectively;
        wherein the one or more data nodes circulate through the non blocking data structure until a candidate for eviction is determined.

2. The system of claim 1, wherein the information relating to the data item comprises one of: the data item, and a reference to the data item.

3. The system of claim 1, wherein the information relating to the data item comprises:
    a reference counter for tracking access frequency to the data item;
    a delete marker indicating whether the data item is flagged for deletion from the cache; and
    a reference pointer that is configurable to point to another data node of the non-blocking data structure.

4. The system of claim 3, wherein the data node is a candidate for eviction in response to satisfying one or more of the following conditions:
    the reference counter indicates a predefined value, or the delete marker is set.

5. The system of claim 1, wherein:
    removing the data node from the queue comprises popping the data node at a head of the queue; and
    inserting the data node back into the queue comprises pushing the data node into a tail of the queue.

6. The system of claim 5, wherein:
    the queue allows multiple threads to push data nodes into, and pop data nodes from, the queue concurrently without lock contention.

7. The system of claim 1, wherein the operations further comprise:
    receiving another data item for caching;
    generating another data node for the another data item; and
    inserting the another data node into the queue.

8. The system of claim 7, wherein the operations further comprise:
    allocating memory for a data node in response to generating the data node; and
    deallocating memory for a data node and a corresponding data item in response to evicting the data node from the non-blocking data structure.

9. The system of claim 1, wherein:
    the non-blocking data structure is unbounded, thereby permitting caching of a variable number of data items of different sizes.

10. The system of claim 1, wherein the data item comprises a web object.

11. A method, comprising:
    removing a data node from a queue of a non-blocking data structure maintaining one or more data nodes, wherein the data node corresponds to a data item in a cache, and the data node comprises information relating to the data item and indicative of frequency at which the data item is accessed;
    determining whether the data node is a candidate for eviction based on the information included in the data node; in response to determining the data node is not a candidate for eviction, inserting the data node back into the queue; and in response to determining the data node is a candidate for eviction, evicting the data node and the data item from the non-blocking data structure and the cache, respectively;

wherein the one or more data nodes circulate through the non-blocking data structure until a candidate for eviction is determined.

12. The method of claim 11, wherein the information relating to the data item comprises one of: the data item, and a reference to the data item.

13. The method of claim 11, wherein:
the information relating to the data item comprises:
a reference counter for tracking access frequency to the data item;
a delete marker indicating whether the data item is flagged for deletion from the cache; and
a reference pointer that is configurable to point to another data node of the non-blocking data structure; and
the data node is a candidate for eviction in response to satisfying one or more of the following conditions: the reference counter indicates a predefined value, or the delete marker is set.

14. The method of claim 11, wherein:
the non-blocking data structure is unbounded, thereby permitting caching of a variable number of data items of different sizes.

15. The method of claim 11, wherein:
removing the data node from the queue comprises popping the data node at a head of the queue; and
inserting the data node back into the queue comprises pushing the data node into a tail of the queue.

16. The method of claim 15, wherein:
the queue allows multiple threads to push data nodes into it and pop data nodes from it, concurrently without lock contention.

17. The method of claim 11, further comprising:
receiving another data item for caching;
generating another data node for the another data item; and
inserting the another data node into the non-blocking data structure.

18. The method of claim 17, further comprising:
allocating memory for a data node in response to generating the data node; and
deallocating memory for a data node and a corresponding data item in response to evicting the data node from the non-blocking data structure.

19. The method of claim 11, wherein the data item comprises a web object.

20. A non-transitory processor-readable medium having instructions which when executed on a computer perform a method comprising:
removing a data node from a queue of a non-blocking data structure maintaining one or more data nodes, wherein the data node corresponds to a data item in a cache, and the data node comprises information relating to the data item and indicative of frequency at which the data item is accessed;

determining whether the data node is a candidate for eviction based on the information included in the data node; in response to determining the data node is not a candidate for eviction, inserting the data node back into the queue; and in response to determining the data node is a candidate for eviction, evicting the data node and the data item from the non-blocking data structure and the cache, respectively;

wherein the one or more data nodes circulate through the non-blocking data structure until a candidate for eviction is determined.

21. The processor-readable medium of claim 20, wherein the information relating to the data item comprises one of: the data item, and a reference to the data item.

22. The processor-readable medium of claim 20, wherein:
the information relating to the data item omprises:
a reference counter for tracking access frequency to the data item;
a delete marker indicating whether the data item is flagged for deletion from the cache; and
a reference pointer that is configurable to point to another data node of the non-blocking data structure; and
the data node is a candidate for eviction in response to satisfying one or more of the following conditions: the reference counter indicates a predefined value, or the delete marker is set.

23. The medium of claim 20, wherein:
the non-blocking data structure is unbounded, thereby permitting caching of a variable number of data items of different sizes.

24. The medium of claim 20, wherein:
removing the data node from the queue comprises popping the data node at a head of the queue: and
inserting the data node back into the queue comprises pushing the data node into a tail of the queue.

25. The medium of claim 24, wherein:
the queue allows multiple threads to push data nodes into it and pop data nodes from it, concurrently without lock contention.

26. The medium of claim 20, wherein the method further comprises:
receiving another data item for caching;
generating another data node for the another data item; and
inserting the another data node into the non-blocking data structure.

27. The medium of claim 26, wherein the method further comprises:
allocating memory for a data node in response to generating the data node; and
deallocating memory for a data node and a corresponding data item in response to evicting the data node from the non-blocking data structure.

28. The medium of claim 20, wherein the data item comprises a web object.

* * * * *